United States Patent Office 3,230,524
Patented Jan. 18, 1966

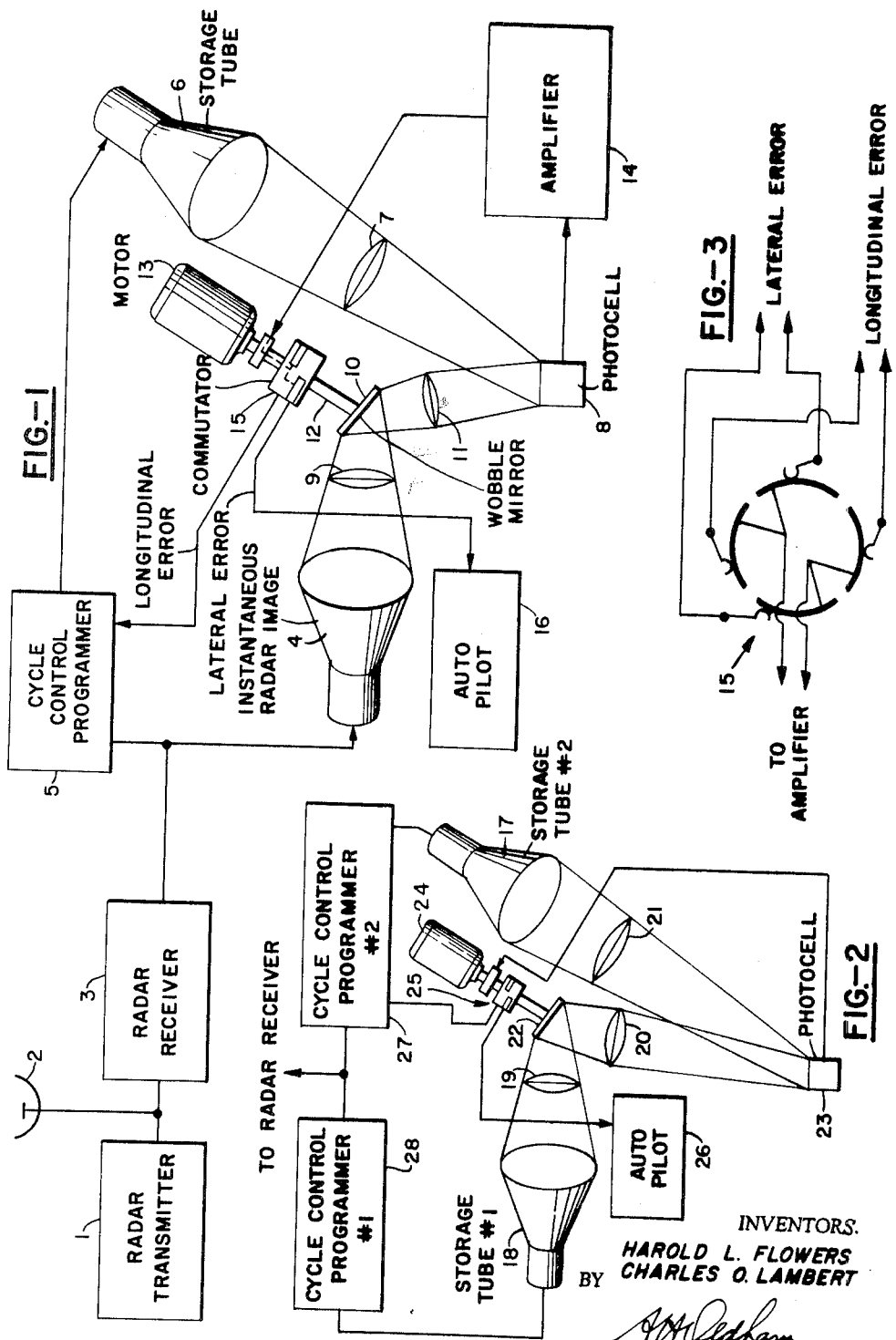

3,230,524
DEAD RECKONING GUIDANCE SYSTEM
FOR VEHICLES
Harold L. Flowers, Cuyahoga Falls, and Charles O. Lambert, Akron, Ohio, assignors to Goodyear Aerospace Corporation, a corporation of Delaware
Filed Aug. 25, 1958, Ser. No. 757,651
7 Claims. (Cl. 343—7)

This invention relates to a fully automatic dead reckoning guidance system for vehicles, such as aircraft and the like, and, more particularly, is concerned with a guidance system utilizing an electronic storage tube for retaining reference information of the terrain over which the vehicle is passing, said reference information being compared to substantially instantaneous terrain information and suitable vehicle guidance corrections then being automatically performed.

It has been proposed heretofore to provide aircraft guidance systems which utilize a comparison between a substantially instantaneous radar image of the terrain over which the aircraft is passing and a previously prepared series of radar maps of the course over which the aircraft is intended to fly to provide error signals keeping the aircraft on course. Systems of this type are described, for example, in the following U.S. patent applications:

Serial No. 790,151, Method and Apparatus for Guiding an Airplane or the Like, filed Dec. 6, 1947, now Patent Number 3,155,969; Serial No. 66,048, Pilotless Aircraft Navigational System, filed Dec. 18, 1948, now Patent Number 3,193,822; and Serial No. 76,152, Electronic Map Matching Apparatus, filed Feb. 12, 1949, now Patent Number 3,178,707.

However, such known systems are open to the objection that radar maps must be made of the terrain over which the aircraft is to pass and sometimes observation flights over enemy held territory for the purpose of preparing radar maps are very difficult to make.

It is the general object of the invention to avoid and overcome the foregoing and other difficulties by the provision of an aircraft guidance system which does not require previously prepared radar maps, and which utilizes, instead, a comparison between time separated radar information picked up by the aircraft when in flight to provide corrective signals to keep the aircraft on course.

Another object of the invention is to provide a guidance system of the type described wherein radar information of the terrain over which the aircraft is passing is temporarily stored in a storage tube, this information is after a selected time interval compared to substantially instantaneous radar information of the terrain over which the aircraft is passing, any course error showing up in the comparison generates an error voltage to bring the aircraft back on course, and this comparison is periodically repeated until the aircraft has flown the selected course.

Another object of the invention is the provision of a dead reckoning type of vehicle guidance system characterized by comparative simplicity, low noise level, and effectiveness of operation.

Another object of the invention is to provide a vehicle guidance system such as described which is particularly adapted for the guidance of aircraft, such as missiles, but which is also adapted to the guidance of surface and submarine ships, particularly when low frequency sonic waves are used instead of high frequency radio waves to obtain terrain information.

Another object of the invention is to provide guidance system mechanism wherein the time separated terrain information is compared optically or electrically to generate guidance corrective signals.

The foregoing objects of the invention, and other objects which will become apparent as the description proceeds, are achieved by the combination in a vehicle guidance system of a radar transmitter, antenna and receiver carried by the vehicle, storage tube means for temporarily and at a controllable repetitive frequency storing a radar picture of the terrain over which the vehicle is passing, means for producing a substantially instantaneous radar image of the terrain over which the vehicle is passing, said picture and image being of substantially the same scale and orientation, means for superimposing the picture and image, means for effecting nutation between the picture and image, commutator means connected to the last-named means to provide an indication of the angular relation at any instant between the picture and image, means providing an electric voltage modulated by the light output of the superimposed picture and image, electrical connections passing the voltage through the commutator means to provide a lateral error voltage and a longitudinal error voltage, an auto pilot connected to the lateral error voltage and correcting the vehicle course laterally, a programmer connected to the longitudinal error voltage and the means for storing a radar picture and controlling the frequency of storing a radar picture of the terrain over which the vehicle is passing.

Or stated in terms of method the invention comprises that method of effecting the guidance of a vehicle over a selected course of terrain which includes the steps of providing time separated wave produced information concerning the terrain over which the vehicle is passing, comparing the time separated information to produce an error voltage if the vehicle is off course, utilizing the error voltage to return the vehicle to course, and periodically repeating the steps to keep the vehicle on course.

More specifically, instead of mechanically and optically comparing the time separated terrain information, the invention teaches electrically comparing the information with means being provided to generate an error signal to return the vehicle to proper course.

For a better understanding of the invention reference should be had to the accompanying drawings wherein:

FIG. 1 is a diagrammatic showing of a simplified version of the invention utilizing mechanical-optical comparison mechanism for the time-separated terrain information;

FIG. 2 is a diagrammatic view of an embodiment of the invention employing a pair of storage tubes each carrying terrain information and the manner of comparing such time-separated information;

FIG. 3 is a detailed wiring diagram of the commutator of FIG. 1 and 2;

Before going into a detailed description of the present invention it is to be noted, as pointed out in the aforesaid patent applications, that the present invention is utilized normally in conjunction with an automatic pilot. In addition, it is a requisite that the vehicle be properly headed on its course at the time the first terrain information is taken and stored.

Coming now to FIG. 1, the vehicle being guided carries wave propagating and receiver means, and with the vehicle constituting an aircraft the wave means comprises radar transmitter 1, antenna 2 and receiver 3 all of which operate in known and conventional manner. Receiver 3 has incorporated therewith a conventional cathode ray tube 4 on which is painted in known fashion a substantially instantaneous radar image of the terrain over which the aircraft is passing.

The receiver 3 is likewise connected through a cycle control or programmer 5 to a storage tube 6, for example of the Raytheon type QK357 on which is temporarily painted and retained a radar picture of the terrain over which the aircraft is passing. It will be understood that during one complete cycle of operation of the apparatus that but a single radar picture of the terrain will be applied to tube 6, this picture being painted at the start of the cycle and with the aircraft properly on course. This picture thus becomes a reference picture to which the substantially instantaneous and constantly changing radar image on tube 4 can be compared during the entire life of the cycle.

The cycle control 5, as hereinafter described, at the end of a selected time cycle (for example, equivalent to the aircraft traveling three miles in relation to the ground) operates to erase the reference picture on storage tube 6 and to allow the receiver 3 to paint a second reference picture on tube 6 to be retained for the life of a second cycle. This cyclic painting and erasing of a reference picture on tube 6 is repeated during the entire flight of the aircraft on its selected course, each new reference picture being painted and the life of each cycle being such that each new reference picture is painted substantially at the time the aircraft is brought back on course.

The picture from storage tube 6 is transmitted via a lens system 7 and is superimposed on a photocell unit 8 as hereintefer described in greater detail.

In order to compare the stored radar picture on tube 6 with the radar image on tube 4 the techniques utilized in the aforesaid applications can be employed. For example, this can be accomplished in a mechanical-optical manner by providing a suitable lens system 9 and a mirror 10 for transmitting the image from tube 4 through a lens system 11 to the photocell unit 8. The plan position indicator (PPI) tube 4 produces a substantially instantaneous image of the terrain over which the vehicle is flying. The image produced on tube 4 is directed by lens 9 against a mirror 10 from which it is reflected through lens 11 to a focusing surface of photocell 8. An opposite contrast image of the stored reference map on storage tube 6 is directed by lens 7 to the focusing surface of the photocell 8. The contrast of the reference image is antonymous with respect to the instantaneous image. The images have substantially the same scale and orientation.

The light which passes through the superimposed images on the following surface is collected by a lens system and directed thereby to light sensitive elements. These elements and amplifier 14 measure the amount of light passing through the superimposed images. The greater the misalignment the greater amount of light sensed by the elements.

The mirror 10 is adapted to be moved in such a manner that the image reflected from it, on the focusing surface will have a movement relative to the reference map to effect a scanning and a matching action of the image and map. This is achieved by mounting the mirror 10 at a slight angle on the end of a shaft 12 driven by motor 13 so that nutation, i.e. relative scanning movement is provided between the picture on tube 6 and the image on tube 4 as the picture and image are superimposed on the focusing surface of the photocell unit 8. Rotation of the mirror causes the reflected image to scan a small circle on the reference map projected on the focusing surface of the photocell 8.

The photocell unit 8 measures the amount of "match" between the picture and image, the output of the photocell unit is connected through a D.C. amplifier 14 to a commutator 15 carried by the shaft 12. The commutator 15, as perhaps better seen in FIG. 3, indicates the quadrant or arcuate area in which the picture and image most closely show "match" with longitudinal and lateral D.C. error voltages being commutated to the cycle control programmer 5 and the auto pilot 16, respectively, all in accord with the teaching of the aforesaid patent applications. In FIG. 3 it will be understood the lateral and longitudinal arcuate segments of the commutator are separated axially as well as circumferentially.

Stated more fully, the commutator 15 contains arcuate conductor segments and are so positioned on the commutator that they indicate in which quadrant the lateral or longitudinal error is the greatest. Electrical contacts such as brushes engage the conductor segments to transmit lateral error signals to the auto pilot 16 and longitudinal error signals to the control programmer 5. The commutator means 15 provides an indication of the angular relation between the images. The circumferentially spaced conductor segments are rotated about the axis of shaft 12 by the motor 13 as a function of the matching of the images on the focusing screen of the photocell unit 8. The angular position of the commutator provides an indication of the angular relation between the picture and the image. Since the arcuate position of the commutator is continually changing as a function of the mismatching or non-alignment of the images it can only produce a substantially instantaneous indication of the relationship between the picture and the image.

Any lateral error voltages applied to the auto pilot 16 act in known fashion to bring the vehicle back on course, and any longitudinal error voltages act to increase or decrease the frequency or cycle of operation of the cycle control programmer 5. In the case of the cycle control programmer, the D.C. error voltage may, merely by way of example, drive a D.C. motor in a forward or reverse direction to turn a potentiometer forward or reverse to thereby change the time or cycle that the picture on tube 6 is retained before it is wiped out and a new picture is painted. Usually the cycle runs a period of time equal to the aircraft covering about three miles over the terrain.

Merely by way of summary of the teaching of the aforesaid patent applications, the error voltage itself is generated in proportion to the amount of "match" effected between the picture and image by the nutation and with the error voltage being commutated into the quarter or quarters and in the direction (positive or negative) so that when applied to the auto pilot the aircraft will be brought back on course (lateral error voltage) or the frequency of the cycles will be changed to better adapt the duration of each cycle to the speed of the aircraft (longitudinal error voltage). In correlating the cycle time to the speed of the aircraft the cycle should neither be too short nor too long, but should provide a sufficient overlap between the picture and the image so that nutation can bring the two into approximate "match."

Instead of visibly comparing the stored radar picture with the substantially instantaneous radar image in the manner heretofore described in conjunction with FIG. 1, it is possible, as shown in FIG. 2, to compare the time separated terrain information and with the use of a pair of storage tubes. More specifically, terrain information in the form of a picture may be painted on storage tube #2, identified by numeral 17, in the same manner as in FIG. 1 and when the aircraft is on course. At a selected time interval thereafter, such as the aircraft covering two ground miles, a second picture of the terrain is painted on storage tube #1, given numeral 18. The two pictures of tube #1 and #2 are then superimposed by lens means 19, 20 and 21, and by mirror 22 over photocell unit 23 as in FIG. 1. The mirror 22 mounted slightly off perpendicular is rotated as before by motor 24 and the output of the photocell is passed through commutator 25 to auto pilot 26 or to cycle control programmer 27. Cycle control programmer 28 controls the entire time of each cycle including the time the picture is allowed to remain on storage tube #1, the erasing of the picture and the painting of a new picture.

In this form of the invention it is possible to effect nutation between the two pictures electronically instead of by the wabble mirror, and the invention likewise contemplates an electronic comparison of the information stored on the storage tube #1 and #2, rather than the optical comparison described.

In any event, from the foregoing it will be recognized that the objects of the invention have been achieved by the provision of a method and mechanism for storing information concerning the terrain over which a vehicle, such as an airplane, is passing when on course, then comparing this information with information of the terrain taken at a later time, and correcting the vehicle course and/or the frequency of the comparison by the comparison of the information.

While a certain respresentative embodiment and details have been shown for the purpose of illustrating the invention, it will be apparent to those skilled in this art that various changes and modifications may be made therein without departing from the spirit and scope of the invention.

What is claimed is:

1. The combination in a dead reckoning guidance system for vehicles of a radar transmitter, antenna and receiver carried by the vehicle, storage tube means for temporarily and at a controllable repetitive frequency storing a radar picture of the terrain over which the vehicle is passing, means for continuously producing a substantially instantaneous radar image of the terrain over which the vehicle is passing, said picture and image being of substantially the same scale and orientation, lens means for superimposing the light of the picture and image, means for effecting nutation between the picture and image, commutator means connected to the last-named means to provide an indication of the angular relation at any instant between the picture and image, photo-cell means providing an electric voltage modulated by the light output of the superimposed picture and image, electrical connections passing the voltage through the commutator means to provide a lateral error voltage and a longitudinal error voltage, an auto pilot connected to the lateral error voltage and correcting the vehicle course laterally, a cycle control programmer connected to the longitudinal error voltage and the means for storing a radar picture and controlling the frequency of storing a radar picture of the terrain over which the vehicle is passing.

2. The combination in a dead reckoning guidance system for vehicles of a radar transmitter, antenna and receiver carried by the vehicle, storage tube means for temporarily and at a controllable repetitive frequency storing a radar picture of the terrain over which the vehicle is passing, means for subsequently and continuously producing a radar image of the terrain over which the vehicle is passing, said picture and image being of substantially the same scale and orientation, means for comparing the light and dark portions of the picture and image, means for effecting nutation between the picture and image, commutator means connected to the last-named means to provide an indication of the angular relation at any instant between the picture and image, photo-cell means providing an electric voltage responsive to the extent of match between the picture and image, electrical connections passing the voltage through the commutator means to provide a lateral error voltage and a longitudinal error voltage, an auto pilot connected to the lateral error voltage and correcting the vehicle course laterally, a cycle control programmer connected to the longitudinal error voltage and the means for storing a radar picture and controlling the frequency of storing a radar picture of the terrain over which the vehicle is passing.

3. The combination in a dead reckoning guidance system for vehicles of a radar transmitter, antenna and receiver carried by the vehicle, storage tube means for temporarily and at a controllable repetitive frequency storing a light and dark radar picture of the terrain over which the vehicle is passing, means for continuously reproducing a substantially instantaneous light and dark radar image of the terrain over which the vehicle is passing, said picture and image being of substantially the same scale and orientation, lens means for superimposing the picture and image, means for effecting nutation between the picture and image, commutator means connected to the last-named means to provide an indication of the angular relation at any instant between the picture and image, photo-cell means providing an electric voltage modulated by the light output of the superimposed picture and image, electrical connections passing the voltage through the commutator means to provide a lateral error voltage and an auto pilot connetced to the lateral error voltage and correcting the vehicle course laterally.

4. The combination in a dead reckoning guidance system for vehicles of a radar transmitter, antenna and receiver carried by the vehicle, storage tube means for temporarily and at a controllable repetitive frequency storing a radar picture of the terrain over which the vehicle is passing, means for subsequently and continuously reproducing a radar image of the terrain over which the vehicle is passing, said picture and image being of substantially the same scale and orientation, means for comparing the light of the picture and image, means for effecting nutation between the picture and image, commutator means connected to the last-named means to provide an indication of the angular relation at any instant between the picture and image, means providing an electric voltage responsive to the extent of match between the picture and image, electrical connections passing the voltage through the commutator means to provide a lateral error voltage and an auto pilot connected to the lateral error voltage and correcting the vehicle course laterally.

5. The combination in a dead reckoning guidance system for vehicles of a radar transmitter, antenna and receiver carried by the vehicle, storage tube means for temporarily and at a controllable repetitive frequency storing a radar picture of the terrain over which the vehicle is passing, means for subsequently but continuously producing a radar image of the terrain over which the vehicle is passing, said picture and image being of substantially the same scale and orientation, lens means for comparing the picture and image, means for effecting nutation between the picture and image, commutator means connected to last-named means to provide an indication of the angular relation at any instant between the picture and image, means providing an electric voltage responsive to the extent of match between the picture and image, electrical connections passing the voltage through the commutator means to provide a lateral error voltage and a longitudinal error voltage, an auto pilot connected to the lateral error voltage and correcting the vehicle course laterally, a cycle control programmer connected to the longitudinal error voltage and the means for storing a radar picture and controlling the frequency of storing a radar picture of the terrain over which the vehicle is passing, said programmer operating at a frequency such that the means for nutating the picture and image will effect substantially at match between the picture and image within the limits of the nutation.

6. Apparatus for effecting the guidance of a vehicle over a selected course of terrain and including means providing a plurality of sets of time separated radiated wave produced information concerning the terrain over which the vehicle is passing, means storing at least one set of said radiated wave produced information, means comparing the stored set of information with a new set of information to produce an error voltage if the vehicle is off course, and means utilizing the error voltage to return the vehicle to course.

7. Apparatus for effecting the guidance of a vehicle over a selected course of terrain which includes means for sending out waves from the vehicle to strike the terrain over which the vehicle is moving, means for storing in the vehicle one set of information reflected back from the terrain, means operating after a selected time delay to send out second waves from the vehicle to strike the terrain over which the vehicle is moving, means picking up the set of information reflected back from the terrain by the second waves, means comparing the sets of time separated information to produce an error voltage if the vehicle is off course, means utilizing the error voltage to return the vehicle to course, and means for periodically repeating the steps to keep the vehicle on course.

References Cited by the Examiner

UNITED STATES PATENTS 2,753,552   7/1956   Horn _____ 343—11

CHESTER L. JUSTUS, *Primary Examiner.*

FREDERICK M. STRADER, KATHLEEN CLAFFY,
*Examiners.*